United States Patent
Ohata et al.

(10) Patent No.: US 11,038,161 B2
(45) Date of Patent: Jun. 15, 2021

(54) NEGATIVE ELECTRODE FOR NICKEL-HYDROGEN SECONDARY BATTERY, AND NICKEL-HYDROGEN SECONDARY BATTERY

(71) Applicant: FDK CORPORATION, Tokyo (JP)

(72) Inventors: Shota Ohata, Tokyo (JP); Jun Ishida, Tokyo (JP); Toshiki Sato, Tokyo (JP); Akira Saguchi, Tokyo (JP)

(73) Assignee: FDK CORPORATION, Tokyo (JP)

( * ) Notice: Subject to any disclaimer, the term of this patent is extended or adjusted under 35 U.S.C. 154(b) by 303 days.

(21) Appl. No.: 16/357,050

(22) Filed: Mar. 18, 2019

(65) Prior Publication Data

US 2019/0305301 A1 Oct. 3, 2019

(30) Foreign Application Priority Data

Mar. 27, 2018 (JP) .............................. JP2018-060440

(51) Int. Cl.
*H01M 4/38* (2006.01)
*H01M 10/34* (2006.01)
(Continued)

(52) U.S. Cl.
CPC ........... *H01M 4/364* (2013.01); *H01M 4/242* (2013.01); *H01M 4/383* (2013.01); *H01M 4/602* (2013.01);
(Continued)

(58) Field of Classification Search
CPC ...... H01M 4/242; H01M 4/383; H01M 4/623; H01M 4/628; H01M 10/30; H01M 10/345
See application file for complete search history.

(56) References Cited

U.S. PATENT DOCUMENTS 5,034,289 A * 7/1991 Yuasa .................. H01M 4/242
429/59
5,639,569 A * 6/1997 Kohler .................. H01M 10/52
429/59
(Continued)

FOREIGN PATENT DOCUMENTS

JP   61-118963    * 4/1986
JP   1055802 A     2/1998
(Continued)

OTHER PUBLICATIONS

Extended European Search Report dated Aug. 28, 2019, received for corresponding European Application No. 19164633.0.

*Primary Examiner* — Jonathan Crepeau
(74) *Attorney, Agent, or Firm* — Kinney & Lange, P.A.

(57) ABSTRACT

A nickel-hydrogen secondary battery includes an electrode group which contains a positive electrode, a negative electrode, and a separator, wherein the negative electrode includes a negative electrode core, and a negative electrode mixture layer held by the negative electrode core, wherein the negative electrode mixture layer contains a fluororesin; a quantity of the fluororesin, expressed by a mass applied per unit area of the negative electrode, is within a range of 0.2 mg/cm$^2$ or more and 2.0 mg/cm$^2$ or less; and a fluororesin content which is a ratio of the fluororesin contained in a unit volume of the negative electrode mixture layer is higher in an inner layer portion than in an outer layer portion in the negative electrode mixture layer.

5 Claims, 2 Drawing Sheets

(51) Int. Cl.
*H01M 4/24* (2006.01)
*H01M 4/62* (2006.01)
*H01M 4/36* (2006.01)
*H01M 4/60* (2006.01)
*H01M 4/02* (2006.01)

(52) U.S. Cl.
CPC ........... *H01M 4/623* (2013.01); *H01M 4/628* (2013.01); *H01M 10/345* (2013.01); *H01M 2004/021* (2013.01); *H01M 2004/027* (2013.01)

(56) References Cited

U.S. PATENT DOCUMENTS 6,156,453 A * 12/2000 Shimizu ................ H01M 4/623
429/212
2015/0280216 A1   10/2015 Sumiyama et al.

FOREIGN PATENT DOCUMENTS

| JP | 2001-291509 | * | 10/2001 |
| JP | 2004327387 A | | 11/2004 |
| JP | 2011019580 A | | 2/2011 |
| WO | 2017168963 A1 | | 10/2017 |

* cited by examiner

NEGATIVE ELECTRODE FOR NICKEL-HYDROGEN SECONDARY BATTERY, AND NICKEL-HYDROGEN SECONDARY BATTERY

CROSS-REFERENCE TO RELATED APPLICATION(S)

This application claims the benefit of Japanese Application No. 2018-060440 filed on Mar. 27, 2018, which is incorporated by reference herein in its entirety.

BACKGROUND

Technical Field

The present disclosure relates to a negative electrode for a nickel-hydrogen secondary battery, and to a nickel-hydrogen secondary battery.

Description of the Related Art

A nickel-hydrogen secondary battery is known as one type of an alkaline secondary battery. Applications of this nickel-hydrogen secondary battery are expanding, and accordingly improvements in various performances are desired. In particular, it is desired to further enhance the safety at the time when being used by a user.

One of the problems related to the safety of the nickel-hydrogen secondary battery is as follows, for example.

When a nickel-hydrogen secondary battery is loaded into a charging device, the positive electrode and the negative electrode can be erroneously loaded by a user, and if the battery is charged in this state (reverse charging), such a defect that the alkaline electrolyte leaks from the inside of the battery may occur. The problem to be solved includes suppression of such a leakage of the liquid.

At the time of reverse charging, a discharge reaction occurs at the positive electrode and the negative electrode, and in a short time, the positive electrode is reversed to generate hydrogen (reaction of the following formula (I)).

$$H_2O + e^- \rightarrow \tfrac{1}{2}H_2 + OH^- \quad (I)$$

In the formula (I), $H_2O$ represents water, $e^-$ electrons, $H_2$ hydrogen, and $OH^-$ hydroxide ions, respectively.

At this time, most of the hydrogen generated in the positive electrode remains in the battery to raise an internal pressure of the battery, but a part of the hydrogen is occluded in a hydrogen storage alloy in the negative electrode by a reaction represented by the following formula (II).

$$\tfrac{1}{2}H_2 + M \rightarrow MH + e^- \quad (II)$$

In the formula, M represents the hydrogen storage alloy, and MH represents a hydrogenated hydrogen storage alloy.

Of the generated hydrogen, hydrogen generated at the time of the reverse charging and remaining in the battery increases the internal pressure of the battery, eventually raises the internal pressure of the battery to a pressure higher than that at which the safety valve operates, and accordingly, the safety valve operates to cause a leakage of the alkaline electrolyte. The leakage of the electrolytic solution at the time of the reverse charging makes an aqueous alkaline solution at a high concentration exposed to the outside of the battery, which can be dangerous. Accordingly, in order to prevent the leakage, various technologies for improving liquid leakage resistance are investigated.

One of technologies for improving the liquid leakage resistance at the time of the reverse charging is a technique of mixing a fluororesin into a negative electrode mixture, as disclosed in Japanese Patent Laid-Open No. 2011-19580. In this technique, the contact area between the alkaline electrolyte and the hydrogen storage alloy decreases due to the water repellency of the fluororesin. The rise in the internal pressure of the battery at the time of the reverse charging described above is suppressed by the increase of a rate of the above described formula (II), that is, the occlusion of hydrogen by the hydrogen storage alloy in the negative electrode. The reaction of the above described formula (II) is caused by the contact of water-insoluble hydrogen gas with the surface of the hydrogen storage alloy. Accordingly, by reducing the contact area between the alkaline electrolyte and the hydrogen storage alloy, the hydrogen gas and the hydrogen storage alloy consequently come into contact with each other more highly, and the reaction of the above formula (II) becomes easy to proceed. As a result, the liquid leakage resistance at the time of the reverse charging improves.

However, in the technique of mixing the above described fluororesin to the negative electrode mixture, the fluororesin, which is an insulator, exists in the negative electrode mixture, thereby the electrical conductivity of the negative electrode itself lowers, and the material resistance increases. Accordingly, there is a problem that the discharge capacity decreases especially under a low temperature environment. As a technique for solving this problem, a technology has been reported in which a fluororesin is not mixed into the negative electrode mixture and the fluororesin is applied to the surface of a negative electrode, as is disclosed in Japanese Patent No. 4524998. The above described technology can reduce the contact area between the hydrogen storage alloy and the alkaline electrolyte, without increasing the electric resistance of the negative electrode mixture layer, by applying a highly water repellent fluororesin to the surface of the negative electrode. Thereby, it is possible to suppress an increase in the internal pressure of the battery without lowering the discharge property.

However, in the technique of Japanese Patent No. 4524998, the discharge property is low as compared with the negative electrode not coated with the fluororesin, and accordingly, it is considered that there is a factor of lowering the discharge property, in addition to the rise in the electric resistance of the above described negative electrode mixture layer. As for the factor, it is assumed that a decrease in the electrolytic solution concentration on the surface of the hydrogen storage alloy during the discharge reaction exerts an influence on the decrease of the discharge capacity. At the time of discharge of the nickel-hydrogen secondary battery, such a reaction proceeds in the negative electrode that a hydroxide ion ($OH^-$) in the electrolytic solution combines with a hydrogen ion ($H^+$) generated from the hydrogen storage alloy to form water ($H_2O$). In other words, the concentration of the electrolytic solution gradually decreases with the generation reaction of water, in the vicinity of the hydrogen storage alloy during the discharge reaction. The decrease in the concentration of the reactive species at the time of the discharge reaction increases the reaction resistance, and thus causes a decrease in the discharge efficiency. In order to compensate for the decrease, it is necessary to supply the electrolytic solution retained by the separator retain to the negative electrode. In the above described negative electrode with a surface coated with the fluororesin, the permeability of the electrolytic solution to the inside of the negative electrode is lowered, and accordingly, the rate of supply of the electrolytic solution at the time of the discharge reaction is slow and the exchange current density is lowered. In particular, under a low temperature environment in which the viscosity of the alkaline electrolyte becomes high, the alkaline electrolyte is less likely to diffuse into the negative electrode, and accordingly there is a problem that the discharge capacity decreases in discharge under the low temperature environment. In other words, a technology for improving the water repellency using the fluororesin in the past has an effect of improving the liquid leakage resistance at the time of the reverse charging, but there is a problem that the low-temperature discharge efficiency becomes low because the discharge capacity decreases under the low temperature environment.

SUMMARY

According to the present disclosure, a negative electrode for a nickel-hydrogen secondary battery is provided, which comprises an electroconductive negative electrode core, and a negative electrode mixture layer carried by the negative electrode core and formed of a negative electrode mixture containing a hydrogen storage alloy, and has a form of a belt as a whole, wherein the negative electrode mixture layer contains a fluororesin; a quantity of the fluororesin, expressed by a mass applied per unit area of the negative electrode, is within a range of 0.2 mg/cm$^2$ or more and 2.0 mg/cm$^2$ or less; and when a total thickness of the negative electrode mixture layer from one end face to the other end face in a thickness direction of the negative electrode is defined as 100%, ranges extending from the one end face and the other end face up to a depth toward the center corresponding to 10% are defined as outer layer portions of the negative electrode mixture layer, respectively, and a layer in a range excluding the outer layer portions is defined as an inner layer portion of the negative electrode mixture layer, a fluororesin content, which is a proportion of the fluororesin contained in a unit volume of the negative electrode mixture layer, is higher in the inner layer portion than in the outer layer portion.

BRIEF DESCRIPTION OF THE DRAWINGS

The present disclosure will become more fully understood from the detailed description given hereinafter and the accompanying drawings which are given by way of illustration only, and thus, are not limitative of the present disclosure, and wherein.

DETAILED DESCRIPTION

A nickel-hydrogen secondary battery (hereinafter referred to as battery) 2 according to the present disclosure will be described below with reference to the drawings.

The battery 2 to which the present disclosure is applied is not limited in particular, but the case will be described as an example, where the present disclosure is applied, for example, to a cylindrical battery 2 with an AA size shown in FIG. 1.

Figure 1:
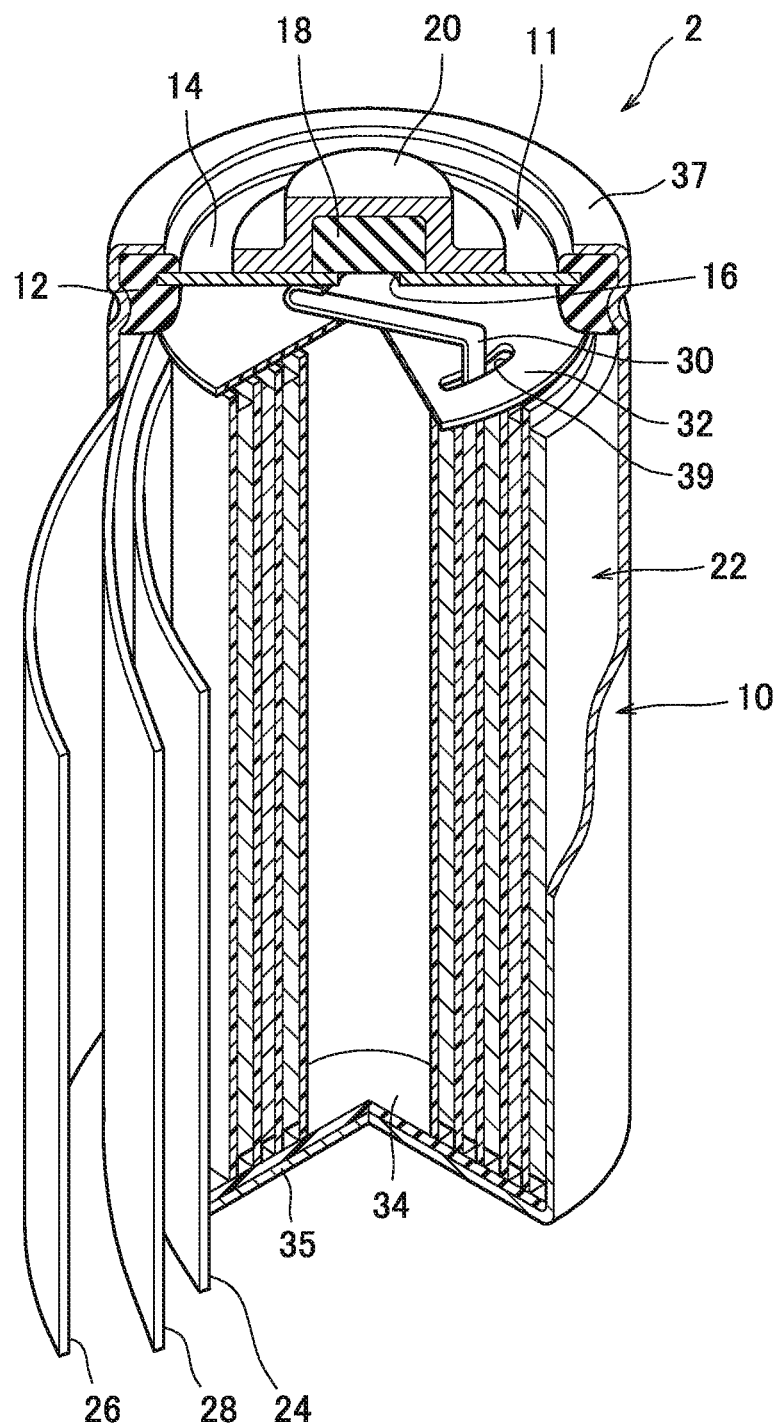
FIG. 1 shows a partially cutaway perspective view showing a nickel-hydrogen secondary battery according to one embodiment of the present disclosure.

As shown in FIG. 1, the battery 2 includes an outer can 10 having a bottomed cylindrical shape with an open upper end. The outer can 10 has electroconductivity, and its bottom wall 35 functions as a negative electrode terminal. A sealing body 11 is fixed to the opening of the outer can 10. The sealing body 11 includes a lid plate 14 and a positive electrode terminal 20, and seals the outer can 10. The lid plate 14 is a disk-shaped member having electroconductivity. The lid plate 14 and a ring-shaped insulating packing 12 which surrounds the lid plate 14 are arranged in the opening of the outer can 10, and the insulating packing 12 is fixed to an opening edge 37 of the outer can 10 by being caulked with the opening edge 37 of the outer can 10. Specifically, the lid plate 14 and the insulating packing 12 cooperate with each other to air-tightly block the opening of the outer can 10.

Here, the lid plate 14 has a central through hole 16 in the center, and a valve body 18 made from rubber, which blocks the central through hole 16, is arranged on the outer surface of the lid plate 14. Furthermore, on the outer surface of the lid plate 14, a positive electrode terminal 20 made from metal, which has a cylindrical shape with a flange, is electrically connected so as to cover the valve body 18. This positive electrode terminal 20 presses the valve body 18 toward the lid plate 14. Incidentally, in the positive electrode terminal 20, an unillustrated vent hole is opened.

Normally, the central through hole 16 is airtightly closed by the valve body 18. On the other hand, when gas is generated in the outer can 10 and the pressure of the gas increases, the valve body 18 is compressed by the pressure of the gas and opens the central through hole 16. As a result, the gas is discharged from the inside of the outer can 10 to the outside, via the central through hole 16 and a vent hole (unillustrated) of the positive electrode terminal 20. In other words, the central through hole 16, the valve body 18 and the positive electrode terminal 20 form a safety valve for the battery.

The outer can 10 accommodates an electrode group 22. The electrode group 22 includes each of a belt-like positive electrode 24, a negative electrode 26 and a separator 28, which are spirally wound in a state in which the separator 28 is sandwiched between the positive electrode 24 and the negative electrode 26. In other words, the positive electrode 24 and the negative electrode 26 are overlapped with each other via the separator 28. The outermost circumference of the electrode group 22 is formed by a part (outermost circumferential part) of the negative electrode 26, and contacts with the inner peripheral wall of the outer can 10. In other words, the negative electrode 26 and the outer can 10 are electrically connected to each other.

In addition, in the outer can 10, a positive electrode lead 30 is arranged between one end of the electrode group 22 and the lid plate 14. Specifically, one end of the positive electrode lead 30 is connected to the positive electrode 24, and the other end thereof is connected to the lid plate 14. Accordingly, the positive electrode terminal 20 and the positive electrode 24 are electrically connected to each other via the positive electrode lead 30 and the lid plate 14. A circular upper insulating member 32 is arranged between the lid plate 14 and the electrode group 22, and the positive electrode lead 30 is threaded through a slit 39 which is provided in the upper insulating member 32, and extends. A circular lower insulating member 34 is arranged also in between the electrode group 22 and the bottom portion of the outer can 10.

Furthermore, into the outer can 10, a predetermined amount of an alkaline electrolyte (unillustrated) is injected. The alkaline electrolyte is impregnated in the electrode group 22, and makes an electrochemical reaction (charge and discharge reaction) proceed which occurs between the positive electrode 24 and the negative electrode 26, at the time of charge and discharge. It is preferable to use an aqueous solution containing at least one type of KOH, NaOH and LiOH as a solute, as the alkaline electrolyte solution.

As a material of the separator 28, materials, for example, a nonwoven fabric made of polyamide fibers having a hydrophilic functional group imparted, and a nonwoven fabric made of fibers of polyolefin like polyethylene and polypropylene having a hydrophilic functional group imparted can be used.

The positive electrode 24 contains an electroconductive positive electrode substrate having a porous structure, and a positive electrode mixture retained in the pores of the positive electrode substrate.

As such a positive electrode substrate, a foamed nickel sheet can be used, for example.

The positive electrode mixture contains particles of a positive electrode active material, and a binding agent. In addition, a positive electrode additive is added to the positive electrode mixture, as needed.

The above described binding agent binds the particles of the positive electrode active material to each other, and binds the particles of the positive electrode active material to the positive electrode substrate. Here, usable binding agents include, for example, carboxymethyl cellulose, methyl cellulose, a PTFE (polytetrafluoroethylene) dispersion liquid and an HPC (hydroxypropyl cellulose) dispersion liquid.

Examples of the positive electrode additives include zinc oxide and cobalt hydroxide.

As the particles of the positive electrode active material, nickel hydroxide particles generally used for the nickel-hydrogen secondary battery are used. As the nickel hydroxide particles, it is preferable to adopt nickel hydroxide particles which are made higher in order.

The particles of the positive electrode active material as described above are produced by a production method which is generally used for the nickel-hydrogen secondary battery.

Next, the positive electrode 24 can be produced, for example, as follows.

Firstly, a slurry of the positive electrode mixture is prepared, which contains particles of the positive electrode active material, water and a binding agent. The prepared slurry of the positive electrode mixture is filled, for example, in a foamed nickel sheet, and dried. After drying, the sheet of foamed nickel filled with the particles of nickel hydroxide and the like is rolled and then cut. Thus, the positive electrode 24 is produced.

Next, the negative electrode 26 will be described below.

The negative electrode 26 includes an electroconductive negative electrode core and a negative electrode mixture layer formed of the negative electrode mixture and carried on the negative electrode core, and has a form of a belt as a whole. In addition, in the negative electrode 26, a fluororesin is contained in the negative electrode mixture layer.

The negative electrode core is a belt-like metal material having through holes distributed therein, and a perforated metal sheet, for example, can be used.

The negative electrode mixture is filled not only in the through hole of the negative electrode core, but also is carried on the surface and the rear surface of the negative electrode core in a layered form, and forms a negative electrode mixture layer.

The negative electrode mixture contains particles of a hydrogen storage alloy which can occlude and release hydrogen as a negative electrode active material, a conducting agent, a binding agent and an auxiliary agent for the negative electrode.

The above described binding agent works to bind particles of the hydrogen storage alloy, the conducting agent and the like to each other, and at the same time, bind the particles of the hydrogen storage alloy, the conducting agent and the like to the negative electrode core. Here, the binding agent is not limited in particular, but binding agents commonly used for the nickel-hydrogen secondary battery can be used, for example, a hydrophilic or hydrophobic polymer, and carboxymethylcellulose.

In addition, usable auxiliary agents for the negative electrode include styrene-butadiene rubber, and sodium polyacrylate.

The hydrogen storage alloy in the particles of the hydrogen storage alloy is not limited in particular, and it is preferable to use a hydrogen storage alloy used in a general nickel-hydrogen secondary battery. It is more preferable to use a hydrogen storage alloy having a composition represented by the following general formula (III).

$$Ln_{1-x}Mg_xN_{y-a-b}Al_aM_b \quad (III)$$

In the general formula (III), Ln represents at least one element selected from among La, Ce, Pr, Nd, Pm, Sm, Eu, Gd, Tb, Dy, Ho, Er, Tm, Yb, Lu, Sc, Y, Ti and Zr, M represents at least one element selected from among V, Nb, Ta, Cr, Mo, Mn, Fe, Co, Ga, Zn, Sn, In, Cu, Si, P and B, and subscripts a, b, x and y satisfy relationships represented by $0.05 \leq a \leq 0.30$, $0 \leq b \leq 0.50$, $0 \leq x < 0.05$, and $2.8 \leq y \leq 3.9$.

The particles of the hydrogen storage alloy can be obtained, for example, in the following way.

Firstly, metal raw materials are weighed and mixed so as to become a predetermined composition, and this mixture is melted, for example, in a high-frequency induction melting furnace, and formed into an ingot. The obtained ingot is subjected to heat treatment, which is heating in an inert gas atmosphere at 900 to 1200° C. for 5 to 24 hours. After this, the ingot is pulverized and sieved, and thereby particles of the hydrogen storage alloy are obtained, which have a desired particle size.

Here, the particle size of the particles of the hydrogen storage alloy is not limited in particular, but the particles having an average particle diameter of 55.0 to 80.0 μm are preferably used. Here, the average particle diameter means a volume average particle diameter (MV) which has been determined by a laser diffraction/scattering method with the use of an apparatus for measuring a particle size distribution.

A conducting agent generally used for the negative electrode of a nickel-hydrogen secondary battery is used as the conducting agent. For example, carbon black or the like is used.

Next, the fluororesin is an ingredient which imparts water repellency to the negative electrode mixture layer in the negative electrode, and is contained in fine voids of the negative electrode mixture layer. This fluororesin contributes to the reduction of the contact area between the alkaline electrolyte and the surface of the hydrogen storage alloy. Thereby, hydrogen gas generated on the positive electrode at the time of the reverse charging becomes easy to come in contact with the hydrogen storage alloy, and becomes easy to be absorbed by the hydrogen storage alloy. As a result, the rise in the internal pressure of the battery is suppressed, and it is suppressed that the safety valve operates and the alkaline electrolyte is discharged to the outside of the battery. In other words, liquid leakage resistance is improved.

It is preferable to use, for example, polytetrafluoroethylene (hereinafter referred to as PTFE), a tetrafluoroethylene-hexafluoropropylene copolymer (hereinafter referred to as FEP), a perfluoroalkoxy alkane (hereinafter referred to as PFA), as the fluororesin.

A content (or quantity) of the fluororesin, expressed by a mass applied per unit area of the negative electrode, is set within a range of 0.2 mg/cm$^2$ or more and 2.0 mg/cm$^2$ or less. When the content of the fluororesin is less than 0.2 mg/cm$^2$, the contact area between the surface of the hydrogen storage alloy and the alkaline electrolyte cannot be sufficiently reduced, and the effect of improving the liquid leakage resistance at the time of the reverse charging is small. On the other hand, when the content of the fluororesin exceeds 2.0 mg/cm$^2$, due to the presence of a large amount of the fluororesin having high water repellency in the negative electrode mixture layer, the permeability of the alkaline electrolyte to the negative electrode greatly lowers, and discharge property under the low temperature environment lowers. Because of this, the content of the fluororesin is set within the above described range.

In the negative electrode mixture layer of the present disclosure, when the length between one end face in the thickness direction of the negative electrode 26 and the other end face opposite to the one end face is defined as the total thickness, and the total thickness is defined as 100%, ranges extending from the one end face and the other end face up to the depth toward the center corresponding to 10% in the thickness direction of the negative electrode are defined as the outer layer portions, respectively. Then, the range excluding these outer layer portions, in other words, the range sandwiched between the outer layer portion on the one end face side and the outer layer portion on the other end face side is defined as the inner layer portion.

In such a negative electrode mixture layer, the fluororesin is controlled to such a distribution state as to exist more in the inner layer portion of the negative electrode mixture layer than in the outer layer portion of the negative electrode mixture layer. Here, when a proportion of the fluororesin contained in the unit volume of the negative electrode mixture layer is defined as the fluororesin content, in the present disclosure, the fluororesin content of the inner layer portion is controlled to be higher than the fluororesin content of the outer layer portion. Preferably, the fluororesin content in the inner layer portion is controlled to be 1.10 times or more of the fluororesin content in the outer layer portion, in other words, a ratio of inner layer/outer layer of the fluororesin, which is a ratio of the fluororesin content in the inner layer portion to the fluororesin content in the outer layer portion, is controlled to be 1.10 or larger. This is because if the ratio of the inner layer/outer layer of the fluororesin is 1.10 or larger, it is possible to obtain an effect of improving the liquid leakage resistance at the time of the reverse charging and an effect of improving the low-temperature discharge efficiency. This is because it is considered that if the ratio of the inner layer/outer layer of the fluororesin is 1.10 or larger, the contact area between the hydrogen storage alloy and the alkaline electrolyte can be suppressed to a low value, and the internal pressure rise in the battery can be suppressed; and also the water repellency on the surface of the negative electrode can be suppressed to a low value, accordingly the alkaline electrolyte becomes easy to permeate into the negative electrode, accordingly the alkaline electrolyte becomes easy to be supplied into the negative electrode, and the decrease of the concentration of the alkaline electrolyte at the time of the discharge reaction can be suppressed. Incidentally, in order to further improve the low-temperature discharge efficiency, it is preferable to control the ratio of the inner layer/outer layer of the fluororesin to a higher value, and it is more preferable to control the ratio of the inner layer/outer layer of the fluororesin to 1.45 or larger.

Here, when the ratio of the inner layer/outer layer of the fluororesin is less than 1.1, a sufficient effect of improving the low-temperature discharge efficiency cannot be obtained. This is because though the effect of improving the low-temperature discharge efficiency is brought about by such a phenomenon that the water repellency of the surface of the negative electrode lowers and the alkaline electrolyte easily permeates into the negative electrode, when the ratio of the inner layer/outer layer of the fluororesin is smaller than 1.1, the amount of the fluororesin existing in the outer layer portion becomes relatively large, and the water repellency on the surface of the negative electrode results in being enhanced. Accordingly, as described above, it is preferable to control the ratio of the inner layer/outer layer of the fluororesin to 1.1 or larger. On the other hand, as described above, in order to further improve the low-temperature discharge efficiency, it is preferable to control the ratio of the inner layer/outer layer of the fluororesin to a higher value, but in such a method of producing the negative electrode as to make the dispersion liquid of the fluororesin permeate from the outer layer portion of the negative electrode mixture layer, which will be described later, it is difficult to control the ratio of the inner layer/outer layer of the fluororesin to a value exceeding 12.0. Therefore, it is preferable to control the ratio of the inner layer/outer layer of the fluororesin to 12.0 or smaller.

The negative electrode 26 can be produced in the following way, for example.

Firstly, powder of the hydrogen storage alloy, which is an aggregate of the particles of the hydrogen storage alloy as described above, a conducting agent, a binding agent and water are prepared, the substances are kneaded, and a paste of the negative electrode mixture is prepared. The obtained paste is applied to the negative electrode core, and is dried. After drying, the negative electrode core which carries the negative electrode mixture is subjected to a rolling step in which the whole is rolled, and thereby, a bulk density of the negative electrode mixture layer is adjusted. Thus, an intermediate product of the negative electrode is obtained.

Next, a dispersion liquid of the fluororesin is supplied to the intermediate product of the negative electrode, and the dispersion liquid of the fluororesin is permeated into the negative electrode mixture layer. The method for permeating the dispersion liquid of the fluororesin is not limited in particular, but for example, the dispersion liquid of the fluororesin is applied to the intermediate product of the negative electrode, and is kept at a predetermined temperature for a predetermined time period. By such a permeation step of the dispersion liquid of the fluororesin being provided, the dispersion liquid of the fluororesin continues the permeation into the inside of the negative electrode mixture layer. At this time, the dispersion liquid gradually permeates from the surface of the negative electrode mixture layer to the inside, and the amount of the dispersion liquid existing in the inner layer portion becomes larger than the amount of the dispersion liquid existing in the outer layer portion. Then, after this permeation step, a drying step for performing a drying treatment is provided, and thereby water content in the dispersion liquid is evaporated. As a result, the fluororesin remains in the negative electrode mixture layer, in such a state as to be contained and exist more in the inner layer portion than in the outer layer portion. In other words, such a distribution state can be obtained that the content of the fluororesin is higher in the inner layer portion than in the outer layer portion, in the negative electrode mixture layer.

Here, in the above described permeation step of the dispersion liquid of the fluororesin, it is preferable to apply the dispersion liquid of the fluororesin to the intermediate product of the negative electrode under the environment of 20° C. or higher and 25° C. or lower, and to hold the resultant intermediate product under the same environment of 20° C. or higher and 25° C. or lower, for 1 minute or longer and 10 minutes or lower. When the environment temperature is lower than 20° C., the permeability of the dispersion liquid of the fluororesin into the negative electrode mixture layer lowers. On the other hand, when the environment temperature exceeds 25° C., water content partially vaporizes, the viscosity of the dispersion liquid of the fluororesin increases, and the permeability of the dispersion liquid of the fluororesin into the negative electrode mixture layer lowers. Because of this, it is preferable to set the environment temperature in the permeation step at the above described range. In addition, if the holding time in the permeation step is shorter than 1 minute, the dispersion liquid of the fluororesin resists permeating into the inner layer portion of the negative electrode mixture layer. On the other hand, if the holding time exceeds 10 minutes, it becomes difficult to obtain an adequate distribution state of the dispersion liquid of the fluororesin. Because of this, it is preferable to set the holding time in the permeation step at the above described range.

Furthermore, in the drying step after the permeation step, it is preferable to hold the intermediate product of the negative electrode having been subjected to the permeation step, under a temperature environment of 40° C. or higher and 80° C. or lower for 5 minutes or longer and 15 minutes or shorter, and to evaporate the water content of the dispersion liquid of the fluororesin. When the drying temperature is lower than 40° C., evaporation of the water content in the dispersion liquid of the fluororesin does not proceed satisfactorily, and it becomes difficult to keep the distribution state of the fluororesin in a target distribution state. On the other hand, if the temperature exceeds 80° C., the fluororesin and other constituent materials may change in quality. Because of this, it is preferable to set the drying temperature in the drying step at the above described range. When the holding time in the drying step is shorter than 5 minutes, the dispersion liquid of the fluororesin does not dry sufficiently. On the other hand, if the dispersion liquid is held for at least 15 minutes, the drying of the dispersion liquid is completed. Because of this, it is preferable to set the holding time in the drying step at the above described range.

Here, the method of applying the dispersion liquid of the fluororesin to the intermediate product of the negative electrode is not limited in particular, but it is preferable to adopt, for example, a technique of applying the dispersion liquid with a brush, a sponge roller, a doctor blade or the like, or a technique of immersing the intermediate product in the dispersion liquid.

Incidentally, in the rolling step described above, the rolling treatment is preferably performed so that the bulk density of the negative electrode mixture layer becomes 4.0 g/cm$^3$ or higher and 7.0 g/cm$^3$ or lower. When the bulk density of the negative electrode mixture layer is lower than 4.0 g/cm$^3$, the binding property of the negative electrode mixture layer is weak, and when the dispersion liquid of the fluororesin has been applied, the negative electrode mixture layer peels. Accordingly, it becomes difficult to obtain the intended negative electrode. On the other hand, when the bulk density exceeds 7.0 g/cm$^3$, the voids in the negative electrode mixture layer decrease and the permeability of the dispersion liquid of the fluororesin lowers in the permeation step which is a post process; and accordingly, it becomes difficult to control the fluororesin content in the negative electrode mixture layer higher in the inner layer portion than in the outer layer portion. Therefore, it is preferable to perform rolling so that the bulk density of the negative electrode mixture layer becomes in the above described range.

As described above, the intermediate product of the negative electrode having been subjected to the permeation step and the drying step of the dispersion liquid of the fluororesin is cut into a predetermined shape. Thereby, the negative electrode 26 is obtained of which the negative electrode mixture layer contains the fluororesin.

Here, it is preferable that the total thickness of the negative electrode used in the present disclosure is 0.100 mm or more and 0.550 mm or less. This is because when the total thickness is less than 0.100 mm, the mass of the hydrogen storage alloy which can be filled in one plate of the electrode plate is low, and it becomes difficult to obtain the required battery capacity; and on the other hand, when the total thickness is greater than 0.550 mm, the volume of the negative electrode increases, which occupies the constituent members of the battery, and it becomes difficult that the outer can accommodates the electrode group.

The positive electrode 24 and the negative electrode 26 which have been produced in the above described way are spirally wound in which the separator 28 is interposed therebetween, and thereby the electrode group 22 is formed.

The electrode group 22 obtained in this way is accommodated in the outer can 10. Subsequently, a predetermined amount of the alkaline electrolyte is injected into the outer can 10. After that, the outer can 10 which has accommodated the electrode group 22 and the alkaline electrolyte is sealed by the sealing body 11 provided with the positive electrode terminal 20, and the battery 2 according to the present disclosure is obtained. The obtained battery 2 is subjected to initial activation treatment, and is brought into a usable state.

The battery 2 according to the present disclosure has such a structure that the negative electrode contained in the battery has the negative electrode mixture layer in which the fluororesin content is higher in the inner layer portion than in the outer layer portion, accordingly the contact area between the alkaline electrolyte and the hydrogen storage alloy can be lowered due to the water repellency of the fluororesin, and also that the fluororesin exists less in the outer layer portion and accordingly the alkaline electrolyte easily permeates into the inside from the surface of the negative electrode. Because of this, the battery 2 according to the present disclosure is a battery which can achieve both of the improvement of the liquid leakage resistance at the time of the reverse charging and the improvement of low-temperature discharge efficiency, and is excellent in safety.

EXAMPLES

1. Production of Battery

Example 1

(1) Production of Positive Electrode

Nickel sulfate, zinc sulfate, magnesium sulfate and cobalt sulfate were weighed so that Ni:Zn:Mg:Co=100:3:0.4:1 holds, the substances were added to a 1 N aqueous solution of sodium hydroxide containing an ammonium ion to prepare a mixed aqueous solution. While the obtained mixed aqueous solution was stirred, a 10 N aqueous solution of sodium hydroxide was gradually added to the mixed aqueous solution to cause a reaction. A pH during the reaction here was stabilized at 13 to 14, and particles of a positive electrode active material were formed which was mainly nickel hydroxide and dissolved Zn, Mg and Co therein.

The obtained particles of the positive electrode active material were washed three times with ten times the amount of pure water, and then subjected to dehydration and drying treatment. Thereby, powder of the positive electrode active material was obtained, which was an aggregate of the particle of the positive electrode active material. Incidentally, the particle size of the particles of the obtained positive electrode active material was measured with the use of a laser diffraction/scattering type apparatus for measuring a particle size distribution, and as a result, the volume average particle diameter (MV) of the particles of the positive electrode active material was 8 μm.

Next, 2.1 parts by mass of powder of cobalt hydroxide, 0.6 parts by mass of powder of yttrium oxide, 20 parts by mass of a dispersion liquid of hydroxypropyl cellulose (HPC), 2.0 parts by mass of powder of zinc oxide, 0.56 parts by mass of powder of PTFE and 57.0 parts by mass of water were added to 100 parts by mass of the powder of the positive electrode active material which was obtained in the above described way, the substances were kneaded, and a slurry of the positive electrode mixture was prepared.

Next, the slurry of the positive electrode mixture was filled in foamed nickel with a sheet form, which was a positive electrode substrate. As for the foamed nickel which was used here, a surface density (basis weight) was approximately 600 g/m$^2$, porosity was 95%, and thickness was approximately 2 mm.

The foamed nickel filled with the slurry of the positive electrode mixture was dried, rolled, and then cut into a predetermined size, and a positive electrode 24 for an AA size was obtained.

(2) Production of Negative Electrode

Metal materials of La, Sm, Mg, Ni and Al were mixed so that each becomes a predetermined molar ratio, and a mixture was obtained. This mixture was melted in a high frequency induction melting furnace in an inert gas (argon gas) atmosphere, and the obtained molten metal was poured into a casting mold, and cooled to room temperature; and an alloy ingot was obtained. Then, the alloy ingot was subjected to heat treatment in which the ingot was held at 1000° C. for 10 hours in an argon gas atmosphere, and homogenized. After that, the resultant ingot was mechanically pulverized in an argon gas atmosphere, and powder of a rare-earth-Mg—Ni-based hydrogen storage alloy was obtained. The particle size distribution of the obtained powder of the rare-earth-Mg—Ni-based hydrogen storage alloy was measured with a laser diffraction/scattering type apparatus for measuring the particle size distribution. As a result, the volume average particle diameter (MV) was 75 μm.

In addition, a composition of the obtained hydrogen storage alloy was analyzed with the use of an inductively-coupled plasma (ICP) emission spectrophotometer, and as a result, the composition of the hydrogen storage alloy was $La_{0.194}Sm_{0.776}Mg_{0.03}Ni_{3.30}Al_{0.20}$.

Next, 0.1 parts by mass of powder of carboxymethyl cellulose (CMC), 1.0 part by mass of a dispersion liquid of a styrene butadiene rubber (SRB), 1.0 part by mass of powder of carbon black and 30 parts by mass of water were added to 100 parts by mass of the powder of the obtained hydrogen storage alloy, the substances were kneaded, and a paste of the negative electrode mixture was prepared.

This paste of the negative electrode mixture was uniformly applied to both sides of a perforated metal sheet which was a negative electrode core so that the thicknesses became fixed. This perforated metal sheet is a belt-shaped body made from iron with a large number of through holes formed therein and has a thickness of 60 μm; and the surface thereof is plated with nickel. Incidentally, the paste of the negative electrode mixture is filled also in the through hole of the perforated metal sheet.

Next, after the negative electrode mixture paste was dried, the negative electrode mixture which was carried on the perforated metal sheet was rolled. In this roll rolling, the total thickness of the negative electrode mixture layer was controlled to 0.40 mm, and the bulk density of the negative electrode mixture layer was set at 6.3 g/cm$^3$. After that, the resultant metal sheet was cut into a predetermined size, and an intermediate product of the negative electrode was obtained.

Next, a dispersion liquid containing PFA as a fluororesin was applied to the intermediate product of the negative electrode with a brush under a temperature environment of 25° C. Then, the intermediate product of the negative electrode coated with the dispersion liquid containing PFA was subjected to permeation treatment which held the intermediate product under a temperature environment of 25° C. for 5 minutes, and made the dispersion liquid containing the PFA permeate into the negative electrode mixture layer. After that, the intermediate product of the negative electrode into which the dispersion liquid permeated was held for 10 minutes under a temperature environment of 60° C., and subjected to drying treatment. After that, the intermediate product was cut into a predetermined size. Thus, a negative electrode 26 containing the fluororesin (PFA) was obtained.

Here, the fluororesin is supplied by the dispersion liquid containing the fluororesin as described above. In the case where the amount of the dispersion liquid to be supplied was defined as an amount of the dispersion liquid supplied, the amount of the dispersion liquid supplied was controlled so that the content of the fluororesin contained in the negative electrode mixture layer after the drying treatment, expressed by a mass per unit area of the negative electrode, became 1.0 mg/cm$^2$.

Incidentally, a plurality of the above negative electrodes was produced; and some of the negative electrodes were used for being built in batteries, and the remaining negative electrodes were used for analysis.

(3) Assembly of Nickel-Hydrogen Secondary Battery

The positive electrode 24 and the negative electrode 26 obtained in the above described way were spirally wound in a state in which the separator 28 was sandwiched between the electrodes, and an electrode group 22 was produced. Here, the separator 28 used for producing the electrode group 22 was a nonwoven fabric made of polypropylene fiber, which was subjected to sulfonation treatment, and the thickness was 0.1 mm (fabric weight of 40 g/m$^2$).

On the other hand, an alkaline electrolyte was prepared which was an aqueous solution containing KOH, NaOH and LiOH as solutes. In this alkaline electrolyte, a mass mixing ratio of KOH, NaOH and LiOH is KOH:NaOH:LiOH=11.0: 2.6:1.0. In addition, the normality of this alkaline electrolyte is 8N.

Next, the above described electrode group 22 was accommodated in, and also 2.9 g of the prepared alkaline electrolyte solution was injected into the outer can 10 having the bottomed cylindrical shape. After that, the opening of the outer can 10 was blocked with a sealing body 11, and a battery 2 of the AA size was assembled, which had a nominal capacity of 2000 mAh.

(4) Initial Activation Treatment

The obtained battery 2 was subjected to charging/discharging cycles repeatedly five times, of which the one cycle is a charging/discharging operation of charging the battery at a charging current of 0.2 A (0.1 C) for 16 hours under a temperature environment of 25° C., and then discharging the battery at a discharge current of 0.4 A (0.2 C) until the time when the battery voltage reached 1.0 V. Thus, the battery 2 was subjected to the initial activation treatment and brought into a usable state.

Example 2

A nickel-hydrogen secondary battery was produced in a similar way to that in Example 1, except that an intermediate product of the negative electrode coated with the dispersion liquid containing PFA as a fluororesin was subjected to permeation treatment in which the intermediate product was held under a temperature environment of 25° C. for 10 minutes to permeate the dispersion liquid containing the PFA into the negative electrode mixture layer.

Example 3

A nickel-hydrogen secondary battery was produced in a similar way to that in Example 1, except that the amount of the dispersion liquid containing PFA as a fluororesin supplied was set at such an amount that a content (or quantity) of the fluororesin contained in the negative electrode mixture layer after the drying treatment became 0.2 mg/cm$^2$, and an intermediate product of a negative electrode coated with the dispersion liquid containing the PFA as the fluororesin was subjected to permeation treatment in which the intermediate product was held under a temperature environment of 25° C. for 10 minutes to permeate the dispersion liquid containing the fluororesin into the negative electrode mixture layer.

Example 4

A nickel-hydrogen secondary battery was produced in a similar way to that in Example 1, except that an amount of the dispersion liquid containing PFA as a fluororesin supplied was set at such an amount that a content (or quantity) of the fluororesin contained in the negative electrode mixture layer after the drying treatment became 0.5 mg/cm$^2$, and an intermediate product of a negative electrode coated with the dispersion liquid containing the PFA as the fluororesin was subjected to permeation treatment in which the intermediate product was held under a temperature environment of 25° C. for 10 minutes to permeate the dispersion liquid containing the fluororesin into the negative electrode mixture layer.

Example 5

A nickel-hydrogen secondary battery was produced in a similar way to that in Example 1, except that the amount of the dispersion liquid containing PFA as a fluororesin supplied was set at such an amount that a content (or quantity) of the fluororesin contained in the negative electrode mixture layer after the drying treatment became 2.0 mg/cm$^2$, and an intermediate product of a negative electrode coated with the dispersion liquid containing the PFA as the fluororesin was subjected to permeation treatment in which the intermediate product was held under a temperature environment of 25° C. for 10 minutes to permeate the dispersion liquid containing the fluororesin into the negative electrode mixture layer.

Comparative Example 1

A nickel-hydrogen secondary battery was produced in a similar way to that in Example 1, except that a dispersion liquid containing PFA as a fluororesin was applied by spray instead of a brush, and the permeation treatment of the dispersion liquid containing the fluororesin was omitted, which held the intermediate product of the negative electrode coated with the dispersion liquid of the fluororesin under a temperature environment of 25° C.

Comparative Example 2

A nickel-hydrogen secondary battery was produced in a similar way to that in Example 1, except that a step of applying a dispersion liquid containing PFA as a fluororesin to an intermediate product of a negative electrode was omitted. In other words, the PFA is not contained in the negative electrode of Comparative Example 2.

Comparative Example 3

A nickel-hydrogen secondary battery was produced in a similar way to that in Example 1, except that the amount of the dispersion liquid containing PFA as a fluororesin supplied was set at such an amount that a content (or quantity) of the fluororesin contained in the negative electrode mixture layer after the drying treatment became 0.1 mg/cm$^2$, and an intermediate product of a negative electrode coated with the dispersion liquid containing the PFA as the fluororesin was subjected to permeation treatment in which the intermediate product was held under a temperature environment of 25° C. for 10 minutes to permeate the dispersion liquid containing the fluororesin into the negative electrode mixture layer.

Comparative Example 4

A nickel-hydrogen secondary battery was produced in a similar way to that in Example 1, except that the amount of the dispersion liquid containing PFA as a fluororesin supplied was set at such an amount that a content (or quantity) of the fluororesin contained in the negative electrode mixture layer after the drying treatment became 4.0 mg/cm$^2$, and an intermediate product of a negative electrode coated with the dispersion liquid containing the PFA as the fluororesin was subjected to permeation treatment in which the intermediate product was held under a temperature environment of 25° C. for 10 minutes to permeate the dispersion liquid containing the fluororesin into the negative electrode mixture layer.

2. Evaluation of Nickel-Hydrogen Secondary Battery (1) Measurement of Fluororesin Content in Negative Electrode The negative electrode for analysis among the negative electrodes produced as described above was embedded in an epoxy resin, and cut so that a cross section of the negative electrode appeared after the epoxy resin was cured, and a sample for the cross-sectional observation of the negative electrode was prepared. Then, the sample for the cross-sectional observation was subjected to an EPMA analysis at an accelerating voltage of 10 keV, and a distribution amount (mass %) of a fluorine element was calculated, which corresponds to the distribution amount of the fluororesin. At this time, the EPMA analysis was performed by dividing the analysis range of the cross section of the negative electrode, into 10 equal parts by the range from the surface side to the rear surface side. Here, the thickness of the negative electrode from the surface side to the rear surface side of the negative electrode (negative electrode mixture layer) was defined as 100%, ranges from the surface and the rear surface to the depth toward the center corresponding to 10% are defined as the outer layer portions of the negative electrode mixture layer, respectively, and the remaining 80% of the layer excluding the outer layer portions is defined as the inner layer portion of the negative electrode mixture layer. In this case, the fluororesin content in the outer layer portion was determined by conversion from an average value of the distribution amount of the fluorine element in the outer layer portion, and the fluororesin content in the inner layer portion was determined by the conversion of the average value of the distribution amount of the fluorine element in the inner layer portion. In addition, a ratio of the inner layer/outer layer, which was a ratio of the fluororesin content in the inner layer portion to that in the outer layer portion, was determined by dividing the fluororesin content in the inner layer portion by the fluororesin content in the outer layer portion. The obtained results are shown in Table 1.

Figure 2:
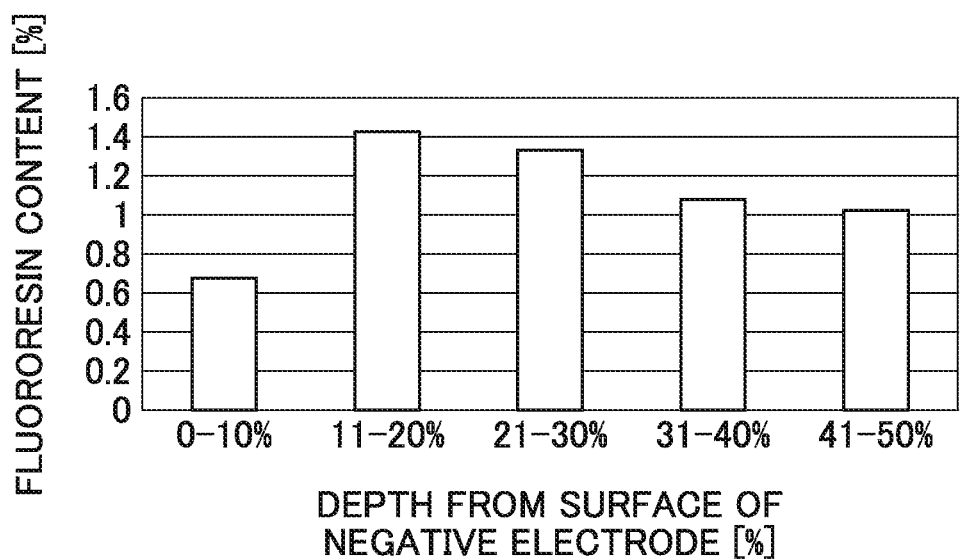
FIG. 2 shows a graph showing a relationship between a depth from the surface of a negative electrode and a fluororesin content, in a negative electrode of Example 2.
Figure 3:
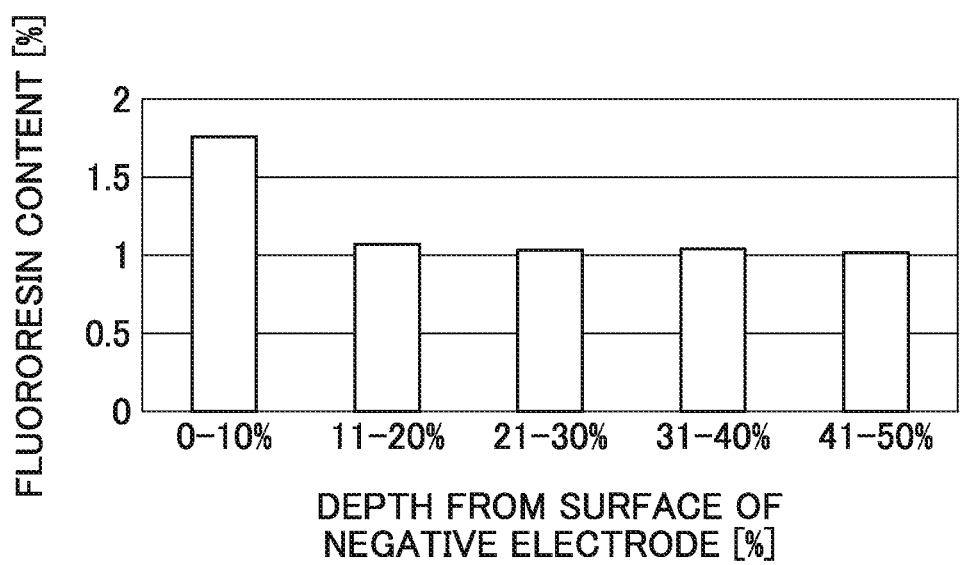
FIG. 3 shows a graph showing the relationship between the depth from the surface of the negative electrode and the fluororesin content, in a negative electrode of Comparative Example 1.

In addition, for Example 2 and Comparative Example 1, graphs showing a relationship between the depth from the surface of the negative electrode and the fluororesin content were prepared from the data of the distribution amount of the fluorine element obtained as described above. These graphs are shown in FIGS. 2 and 3. FIGS. 2 and 3 show fluororesin contents in the ranges divided in the following way: a range in which the depth from the surface of the negative electrode is 0 to 10%, a range in which the depth from the surface of the negative electrode is 11 to 20%, a range in which the depth from the surface of the negative electrode is 21 to 30%, a range in which the depth from the surface of the negative electrode is 31 to 40%, and a range in which the depth from the surface of the negative electrode is 41 to 50%.

(2) Reverse Charging Characteristics

Each of the batteries of Examples and Comparative Examples which were subjected to the above described initial activation treatment was discharged at a discharge current of 0.5 A under an environment of 25° C., in order to having realized a reverse charging state, and were left so that the polarity of the battery was reversed and the battery voltage reached −1.5 V. Here, an amount of time was measured which was required until the battery voltage reached −1.5 V after the start of discharge. Here, this required time was measured on two batteries produced under each condition of Examples and Comparative Examples. The average values of the required time are shown in Table 1 as a polarity reversal time. Incidentally, the polarity reversal time means that the longer the polarity reversal time is, the more resistant to reverse charging the battery is, and the more excellent in the reverse charging characteristics the battery is.

(3) Low-Temperature Discharge Characteristics

Each of the batteries of Examples and Comparative Examples, which was subjected to the above described initial activation treatment, was charged at a charging current of 1.0 C under an environment of 25° C., the charging was finished when the battery voltage dropped to a voltage which was 10 mV lower from the maximum value, and after that, the battery was left under an environment of 25° C. for 3 hours. Next, the battery was discharged at a discharge current of 1.0 C under an environment of 25° C. until the battery voltage reached 1.0 V, and the discharge capacity at this time (referred to as 25° C. discharge capacity) was determined. The battery after the discharge was left for 3 hours under an environment of 25° C., and then was charged at a charging current of 1.0 C under an environment of 25° C., and the charging was finished when the battery voltage dropped to a voltage which was 10 mV lower from the maximum value. The battery after the charging was left for 3 hours under an environment of −10° C., and then was discharged at a discharge current of 1.0 C under an environment of −10° C. until the battery voltage reached 1.0 V, and the discharge capacity at this time (referred to as −10° C. discharge capacity) was determined.

A ratio between the values was determined that were the value of the −10° C. discharge capacity which was determined as described above, and the value of 25° C. discharge capacity. Then, this ratio was expressed by a percentage, and the resultant ratio was shown in Table 1 as the low-temperature discharge ratio.

Here, the value of the low-temperature discharge ratio means that the larger the value is, the lower the degree of decrease in the discharge capacity under the low temperature environment is, and the more excellent the low-temperature discharge efficiency is.

TABLE 1

| | Type of fluororesin | Bulk density of negative electrode mixture layer [g/cm³] | Content (quantity) of fluororesin [mg/cm²] | Fluororesin content of inner layer portion [%] | Fluororesin content of outer layer portion [%] | Ratio of inner layer/outer layer of fluororesin content | Polarity reversal time [min] | Low-temperature discharge ratio [%] |
|---|---|---|---|---|---|---|---|---|
| Example 1 | PFA | 6.3 | 1.0 | 1.09 | 0.75 | 1.45 | 218 | 60.4 |
| Example 2 | PFA | 6.3 | 1.0 | 1.22 | 0.70 | 1.75 | 294 | 64.6 |
| Example 3 | PFA | 6.3 | 0.2 | 1.22 | 0.70 | 1.75 | 106 | 61.2 |
| Example 4 | PFA | 6.3 | 0.5 | 1.22 | 0.70 | 1.75 | 123 | 64.5 |
| Example 5 | PFA | 6.3 | 2.0 | 1.22 | 0.70 | 1.75 | 164 | 63.8 |
| Comparative Example 1 | PFA | 6.3 | 1.0 | 1.05 | 1.76 | 0.59 | 141 | 55.1 |
| Comparative Example 2 | — | 6.3 | — | — | — | — | 92 | 60.3 |
| Comparative Example 3 | PFA | 6.3 | 0.1 | 1.22 | 0.70 | 1.75 | 93 | 60.0 |

TABLE 1-continued

| | Type of fluororesin | Bulk density of negative electrode mixture layer [g/cm³] | Content (quantity) of fluororesin [mg/cm²] | Fluororesin content of inner layer portion [%] | Fluororesin content of outer layer portion [%] | Ratio of inner layer/ outer layer of fluororesin content | Polarity reversal time [min] | Low-temperature discharge ratio [%] |
|---|---|---|---|---|---|---|---|---|
| Comparative Example 4 | PFA | 6.3 | 4.0 | 1.22 | 0.70 | 1.75 | 94 | 61.7 |

(4) Discussion

The ratios of the inner layers/outer layers of the fluororesin contents in Examples 1 to 5 are 1.45 or larger, which means that the fluororesin content in the inner layer portion is higher than the fluororesin content in the outer layer portion. This is also clear from the fact that the values of the fluororesin contents in the inner layer portions (at which depth from surface of the negative electrode is 11% to 50%) are higher than the value of the fluororesin content in the outer layer portion (at which depth from surface of the negative electrode is 0 to 10%), in the graph of FIG. 2.

In contrast to this, the ratio of the inner layer/outer layer of the fluororesin content is 0.59 in Comparative Example 1. This means that the fluororesin content in the inner layer portion is lower than the fluororesin content in the outer layer portion. This is also clear from the fact that the values of the fluororesin contents in the inner layer portions (at which depth from surface of the negative electrode is 11% to 50%) are lower than the value of the fluororesin content in the outer layer portion (at which depth from surface of the negative electrode is 0 to 10%), in the graph of FIG. 3.

In Examples 1 to 5, the dispersion liquid of the fluororesin was applied to an intermediate product of a negative electrode after rolling and held under the environment of 25° C. for 5 to 10 minutes, and then dried under the environment of 60° C. for 10 minutes. In the negative electrode, when the negative electrode mixture layer is rolled, the pressure is preferentially applied to the outer layer portion, and accordingly a void ratio of the negative electrode mixture in the outer layer portion becomes lower than that in the inner layer portion. Accordingly, the inner layer portion which has more voids than the outer layer portion becomes easier to uptake the dispersion liquid of the fluororesin. In addition, in Examples 1 to 5, the intermediate product to which the dispersion liquid of the fluororesin has been applied is held for a predetermined time as the permeation treatment of the dispersion liquid; and by the holding time being adjusted, the degree of the permeation of the dispersion liquid of the fluororesin into the negative electrode mixture layer is controlled. In addition, immediately after that, the resultant intermediate product is subjected to the drying treatment so as to maintain the state. Specifically, in the negative electrodes of Examples 1 to 5, the above described conditions are adjusted to control the distribution of the dispersion liquid of the fluororesin, and thereby the content of the fluororesin in the inner layer portion is controlled so as to be higher than that in the outer layer portion of the negative electrode mixture layer.

On the other hand, as in Comparative Example 1, when the dispersion liquid of the fluororesin is applied by spray, the water which is a solvent of the dispersion liquid becomes misty and easily volatilizes, and accordingly, the fluororesin dispersion liquid resists permeating into the inside of the negative electrode mixture layer. Because of this, in Comparative Example 1, the fluororesin content in the inner layer portion becomes lower than that in the outer layer portion.

In Examples 1 to 5, the polarity reversal times at the time of reverse charging are longer than that in Comparative Example 2. This is considered to be because the contact area between the hydrogen storage alloy and the electrolytic solution can be reduced by the water repellency of the fluororesin, and the hydrogen gas generated on the positive electrode at the time of the reverse charging has become easy to be occluded by the hydrogen storage alloy in the negative electrode mixture layer. In addition, in Examples 1, 2 and 5, the polarity reversal time at the time of the reverse charging has become longer as compared even with that of Comparative Example 1. This is considered to be because the region has increased that does not contact with the electrolytic solution among the portions which can contribute to the gas absorption reaction at the time of the reverse charging in the hydrogen storage alloy, by making the fluororesin permeate to the inner layer portion.

Furthermore, in Examples 1 to 5, the low-temperature discharge ratio has become higher than that in Comparative Example 1. Comparative Example 1 has such a structure that the content of the fluororesin in the outer layer portion is more than that in the inner layer portion. On the other hand, in Examples 1 to 5, the negative electrode has such a structure that the ratio of the inner layer/outer layer of the fluororesin is 1.45 or larger and the content of the fluororesin in the inner layer portion is more than that in the outer layer portion, and accordingly it is assumed that because of the difference, the reaction resistance has decreased at the time of discharge and the discharge property under the low temperature environment has improved.

In addition, as in Comparative Example 3, when the content of the fluororesin is 0.1 mg/cm², which is smaller than 0.2 mg/cm², the polarity reversal time at the time of the reverse charging has been 93 minutes, and becomes a result equivalent to that in Comparative Example 2 which does not contain the fluororesin. This means that when the content of the fluororesin is smaller than 0.2 mg/cm², the content of the fluororesin becomes insufficient, an appropriate water repellent effect cannot be obtained, and accordingly the effect on the liquid leakage resistance at the time of the reverse charging does not appear. On the other hand, as in Comparative Example 4, when the content of the fluororesin is 4.0 mg/cm² which is more than 2.0 mg/cm², a low-temperature discharge ratio becomes a result equivalent to that in Comparative Example 2 to which the fluororesin has not been applied. This is considered to be because a large amount of the fluororesin having the high water-repellency exists in the negative electrode mixture layer, accordingly the permeability of the electrolytic solution to the negative electrode greatly decreases, and the discharge property under the low temperature environment lowers. From these facts, it is considered that the content of the fluororesin to be contained in the negative electrode mixture layer should be controlled to 0.2 mg/cm² or more and 2.0 mg/cm² or less.

As described above, according to the present disclosure, the fluororesin is contained in the negative electrode so that the content of the fluororesin in the inner layer portion (layer more inside than layer in between surface and plane reaching 10% of total thickness from surface) becomes more than that of the outer layer portion of the negative electrode mixture layer (layer in between surface and plane reaching 10% of total thickness from surface), and the content (quantity) of fluororesin at this time is controlled to 0.2 mg/cm$^2$ or more and 2.0 mg/cm$^2$ or less: and thereby the nickel-hydrogen secondary battery can be provided in which the liquid leakage resistance at the time of the reverse charging is high and the discharge efficiency in the low temperature environment is high.

It should be noted that the present disclosure is not limited to the above described embodiments and examples, and can be variously modified. For example, the PFA has been used as the fluororesin in the above described embodiment, but the present disclosure is not limited to this embodiment, and similar effects can be obtained even when PTFE or FEP is used which has the water repellency similarly to the PFA.

<Aspects of the Present Disclosure>

A first aspect of the present disclosure is a negative electrode for a nickel-hydrogen secondary battery, which comprises an electroconductive negative electrode core, and a negative electrode mixture layer that is carried by the negative electrode core and is formed of a negative electrode mixture containing a hydrogen storage alloy, and has a form of a belt as a whole, wherein the negative electrode mixture layer contains a fluororesin; a content (or quantity) of the fluororesin, expressed by a mass applied per unit area of the negative electrode, is within a range of 0.2 mg/cm$^2$ or more and 2.0 mg/cm$^2$ or less; and when a total thickness of the negative electrode mixture layer from one end face to the other end face in a thickness direction of the negative electrode is defined as 100%, ranges extending from the one end face and the other end face up to a depth toward the center corresponding to 10% are defined as outer layer portions of the negative electrode mixture layer, respectively, and a layer in a range excluding the outer layer portions is defined as an inner layer portion of the negative electrode mixture layer, a fluororesin content, which is a proportion of the fluororesin contained in the unit volume of the negative electrode mixture layer, is higher in the inner layer portion than in the outer layer portion.

A second aspect of the present disclosure is the negative electrode for a nickel-hydrogen secondary battery in the above described first aspect of the present disclosure, wherein the fluororesin content of the inner layer portion is 1.45 times or more as large as the fluororesin content of the outer layer portion.

A third aspect of the present disclosure is the negative electrode for a nickel-hydrogen secondary battery in the above described first aspect or second aspect of the present disclosure, wherein a bulk density of the negative electrode mixture layer is 4.0 g/cm$^3$ or higher and 7.0 g/cm$^3$ or lower.

A fourth aspect of the present disclosure is the negative electrode for the nickel-hydrogen secondary battery in any one of the above described first to third aspects of the present disclosure, wherein the fluororesin is a perfluoroalkoxy alkane.

A fifth aspect of the present disclosure is a nickel-hydrogen secondary battery that comprises: a container; and an electrode group accommodated in the container together with an alkaline electrolyte, wherein the electrode group contains a positive electrode and a negative electrode which are overlapped on each other via a separator, and the negative electrode is the negative electrode for a nickel-hydrogen secondary battery in any one of the above described first to fourth aspects of the present disclosure.

Embodiments and aspects of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A negative electrode for a nickel-hydrogen secondary battery comprising an electroconductive negative electrode core, and a negative electrode mixture layer carried by the negative electrode core and formed of a negative electrode mixture containing a hydrogen storage alloy, and having a form of a belt as a whole, wherein:
   the negative electrode mixture layer contains a fluororesin;
   a quantity of the fluororesin, expressed by a mass applied per unit area of the negative electrode, is within a range of 0.2 mg/cm$^2$ or more and 2.0 mg/cm$^2$ or less; and
   with a total thickness of the negative electrode mixture layer from a first end face to a second end face in a thickness direction of the negative electrode being defined as 100%, ranges extending from the first end face and the second end face up to a depth toward the center corresponding to 10% are defined as outer layer portions of the negative electrode mixture layer, respectively, and a layer in a range excluding the outer layer portions being defined as an inner layer portion of the negative electrode mixture layer, a fluororesin content, which is a proportion of the fluororesin contained in a unit volume of the negative electrode mixture layer, is higher in the inner layer portion than in the outer layer portion.

2. The negative electrode for a nickel-hydrogen secondary battery according to claim 1, wherein the fluororesin content of the inner layer portion is 1.45 times or more as large as the fluororesin content of the outer layer portion.

3. The negative electrode for a nickel-hydrogen secondary battery according to claim 1, wherein a bulk density of the negative electrode mixture layer is 4.0 g/cm$^3$ or higher and 7.0 g/cm$^3$ or lower.

4. The negative electrode for a nickel-hydrogen secondary battery according to claim 1, wherein the fluororesin is a perfluoroalkoxy alkane.

5. A nickel-hydrogen secondary battery comprising:
   a container; and an electrode group accommodated in the container together with an alkaline electrolyte,
   wherein the electrode group contains a positive electrode and a negative electrode overlapped on each other via a separator, and
   the negative electrode is the negative electrode for a nickel-hydrogen secondary battery according to claim 1.

* * * * *